(12) United States Patent
Geist

(10) Patent No.: US 6,757,827 B1
(45) Date of Patent: Jun. 29, 2004

(54) AUTONOMOUSLY SECURED IMAGE DATA

(75) Inventor: Bruce K. Geist, Sterling Heights, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/299,260

(22) Filed: Apr. 26, 1999

(51) Int. Cl.[7] .............................. H04L 9/00; G06F 17/60
(52) U.S. Cl. ........................ 713/176; 713/173; 705/51; 705/54
(58) Field of Search ................................. 713/176, 173; 705/51, 54

(56) References Cited

U.S. PATENT DOCUMENTS

| | | | |
|---|---|---|---|
| 5,005,200 A | | 4/1991 | Fischer |
| 5,214,702 A | | 5/1993 | Fischer |
| 5,499,294 A | | 3/1996 | Friedman |
| 5,579,393 A | * | 11/1996 | Conner et al. .................. 705/3 |
| 5,613,004 A | * | 3/1997 | Cooperman et al. ........... 380/28 |
| 5,619,571 A | * | 4/1997 | Sandstrom et al. .......... 380/200 |
| 5,646,997 A | | 7/1997 | Barton |
| 5,659,726 A | | 8/1997 | Sandford, II et al. |
| 5,717,759 A | | 2/1998 | Micali |
| 5,778,070 A | | 7/1998 | Mattison |
| 5,818,955 A | | 10/1998 | Smithies et al. |
| 5,844,986 A | | 12/1998 | Davis |
| 5,958,051 A | * | 9/1999 | Renaud et al. ............... 713/200 |

* cited by examiner

Primary Examiner—Gilberto Barrón
Assistant Examiner—Benjamin E Lanier
(74) Attorney, Agent, or Firm—Lise A. Rode; Mark T. Starr; Michael B. Atlass

(57) ABSTRACT

A method and a data file structure (100) for embedding a digital signature verification key (108) within a particular type of image data file enables validation of the image data (102a,b) autonomously—i.e. without consulting large external data bases of public keys or certificates.

15 Claims, 3 Drawing Sheets

AUTONOMOUSLY SECURED IMAGE DATA

BACKGROUND OF THE INVENTION

1. Field of the Invention

The invention relates to digital image data security structures and their use. More specifically, the invention concerns embedding all necessary verification data with the image's data file thereby rendering the file autonomously secured.

2. Background Art

Banks, credit unions and other financial institutions often image checks, deposit slips and other types of bank documents in order to process financial transactions efficiently. The more confidence a financial institution has in the integrity and point-of-origin of an image, the more it can rely on a document image in lieu of the original paper document. When images are used to facilitate financial transactions, care must be taken to ensure that image data is tamper-evident. It is also advisable to link images with the institution that produced them. When data and integrity can be guaranteed and point-of-origin can be deduced, images can grow in their importance in facilitating financial transactions.

Point-of-origin identification and data integrity authentication for financial images can be realized through the use of public key cryptography. Assuming cryptographic key management techniques are utilized, digitally signed images are tamper evident and origin traceable. Examples of signature algorithms that may be used to sign financial images include RSA (see RSA Laboratories. PKCS #1v2.0:RSA Cryptography Standard, July 1998), DSA (see U.S. Department Of Commerce/N.I.S.T., National Technical Information Service, Springfield, Va. Federal Information Processing Standards (FIPS) 186 Digital Signal Standard, 1994), and ECDSA (see Alfred J. Menezes. Elliptic Curve Public Key Cryptosystems. Kluwer Academic Publishers, 1993). These digital signature schemes require a public/private key pair. The method for generating such a key pair varies with the particular scheme used. However, it is always the case that the private portion of such a key pair and the image itself are used to actually calculate an image's digital signature. In other words, both the image and the private key are required to produce a digital signature. On the other hand, typically the purported original image itself and invariably the public portion of the key pair are required to verify a given digital signature on the image. Thus, the public key part of the key pair verifies what the private key signs. An important property of public/private key systems which produce digital signatures is that disclosure of the public key does not reveal the private key which produces the signatures in the first place.

If verification using the appropriate public key portion of the key pair succeeds, the image must be as it was when the signature was produced. Since only the private key portion of the key pair can calculate the signature, successful verification also means that the image was signed by the possessor of the private key. Under normal circumstances, the private portion of a signing key pair is known only to the key pair owner. Therefore, if a signature verifies, the point-of-origin of the signed image must have been the owner of the private key that produced the digital signature. The act of verifying an image signature in no way reveals any information about the private key that produced the signature. Only the public key and possibly the original image are used in the verification process. Knowledge of the public key does not imply knowledge of the private key, and only the public key which is companion to the private key used to produce the signature will successfully verify the image/signature combination. Another party's public key will not succeed in verifying the image's signature.

Public keys must be provably linked to that key's owner in order to achieve true origin traceability and tamper detection capabilities. Verifying a signature using a public key of unknown origin does not prove origin or data integrity.

Public key certificates provide a mechanism for assuring the authenticity of a public key's owner. A public key certificate includes at least three items. First, is the public key itself. Second is identity information for the owner of the public key, and third, a digital signature issued by a trusted third party.

A public key certificate binds the identity of a public key's owner to the public key itself. A trusted third party, called a certification authority, issues certificates. Before creating a certificate, the certification authority takes appropriate measures to verify the claimed identity information of the entity requesting the certificate. Once the identity information is verified, the certification authority will digitally sign a document containing the public key data and identity information. This signed document becomes the certificate.

Tile certification authority's public key, used for verifying signatures on certificates it issues, is widely distributed, for example on the internet or sent by secure courier to parties wishing to verify certificates. Once issued, a public key certificate may be used to prove the authenticity and ownership of a public key.

In known security and authentication arrangements for image data files, the public key certificate, the public key itself and often most of the other data items required for conducting a validation process are separate entities from the image data file itself. With this prior art arrangement, large data bases of public key certificates (or at the very least a database of uncertified public keys) must be consulted prior to the authentication process. There is, therefore, seen to be a need in the prior art for an image data file arrangement enabling autonomous security and authentication of the image data without resort to external data sources.

SUMMARY OF THE INVENTION

In a first aspect of the invention a method for autonomously securing an image data file comprises the steps of selecting a format for the image data file capable of identifying a predetermined subset of data residing in the data file and capable of storing non-image data in preselected locations in the data file with the image data. Next, authentication data is placed in the preselected locations of the data file, the authentication data comprising data related to a public key certificate and a digital signature.

In a second aspect of the invention a data file format structure for use with image data stored on a computer-readable medium comprises at least one directory entry defining a location within the data file of the image data, a directory entry defining a location within the data file of a public key certificate identifier, and a directory entry defining a location within the data file of a digital signature. With this integral organization, the image data file can be authenticated autonomously by data resident in the image data file itself.

BRIEF DESCRIPTION OF THE DRAWING

The invention is set forth in exemplary fashion by the following detailed description of a preferred embodiment taken in conjunction with the drawing, in which.

DETAILED DESCRIPTION

Figure 1:
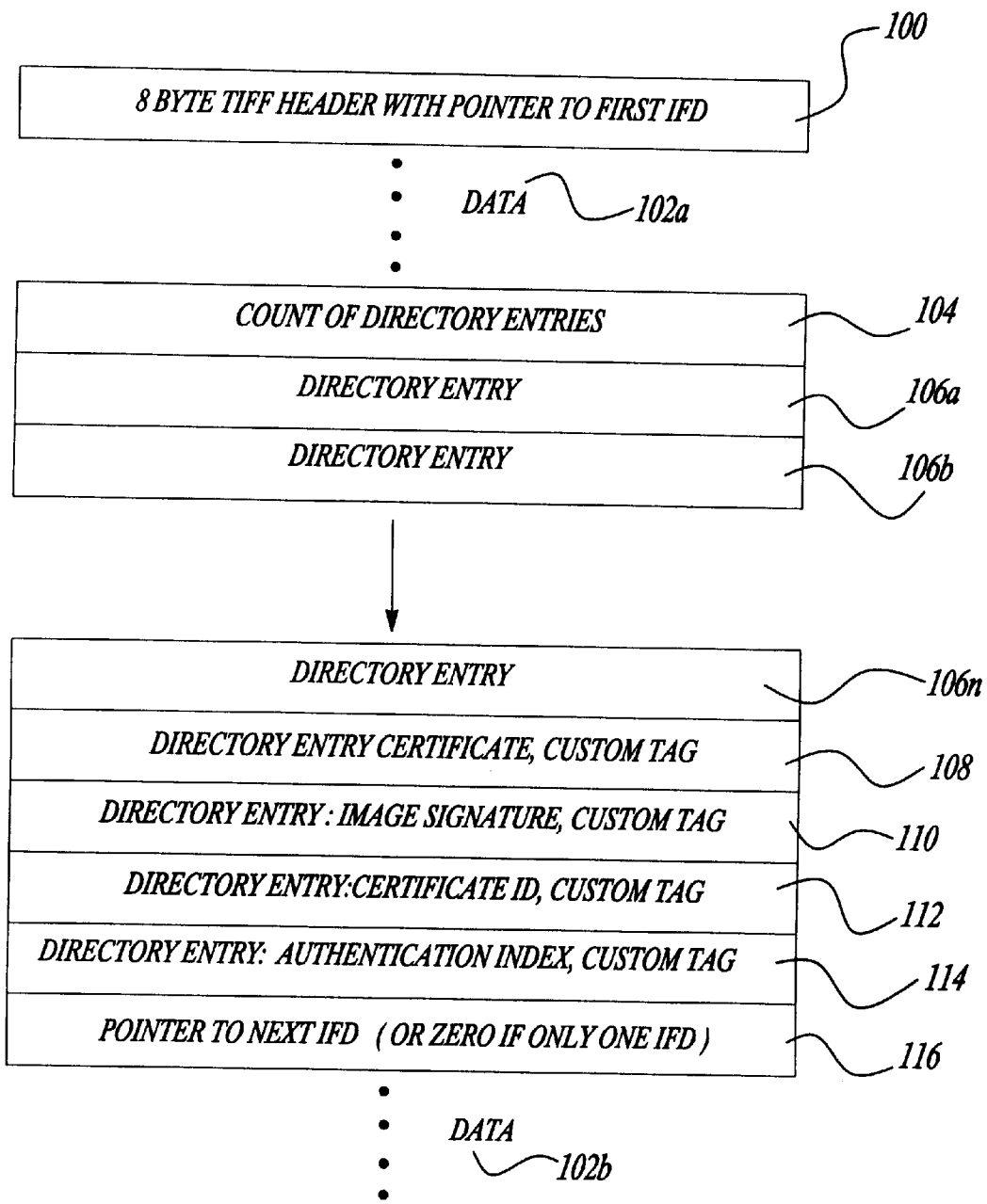
FIG. 1 is a diagram of an autonomously secured tagged image field file arranged in accordance with the principles of the invention.

One image data file format having suitable properties for incorporating the invention is the "tagged image file format", or TIFF. For the complete TIFF file format specification, see TIFF (Tagged Image File Format) revision 6.0, Jun. 3, 1992. This document is available from Adobe Systems Incorporated, 345 Park Avenue, San Jose, Calif. 93110-2704. Many image compression and display schemes commonly used for compressing and displaying financial images are formatted according to known TIFF specifications, including CCITT Group IV compression for black and white images and JPEG compression for gray scale images.

Every TIFF image contains at least one image file directory (IFD) which consists of a two byte count of the number of directory entries, followed by the directory entries themselves, followed by a file offset value to the next image file directory (set to zero if there is only IFD). Each IFD documents the type and location of image information contained in the TIFF file. Each directory entry is a twelve byte field which describes and points to a piece of image information. Each entry contains a two byte tag number, a two byte data type indicator, a four byte count of values of the indicated type which comprise the information the directory entry points to, and finally the information itself, if it fits into the final four byte field of the entry. Otherwise, if the data for a directory entry is larger than what would fit into the last four bytes of the entry, these last four bytes instead contain a file offset pointer to the data. The tag number identifies the type of field which the IFD refers to. Various other tag numbers are assigned to indicate reference to various image attributes.

Thus, a TIFF image file consists of a series of TIFF file records called TIFF fields. Each TIFF field is implemented as an IFD entry plus a value (if that value does not fit into the four bytes of the IFD entry). Each image type/format, whether it be a JPEG gray scale compressed image or a CCITT Group IV compressed black and white image, is associated with a differing set of mandatory and optional TIFF fields. These fields describe, store and organize image data information. Although directory entries themselves are required to appear in a fixed order according to their tag numbers, data associated with a given tag (when larger than four bytes in size) can appear anywhere in the TIFF file—the last four bytes of the directory entry simply point to where in the file the associated data may be found. Further, the directory itself can be located anywhere within the TIFF file.

For purposes of subsequent discussion, let a logical TIFF record be distinguished from a TIFF field, in that a pointer (if it contains one) is replaced by actual data. A logical TIFF record coincides with a TIFF field when its data values fit into the last four bytes of the TIFF file record. In the event a TIFF field actually contains a pointer to data (because that data would not fit into four bytes), the corresponding logical TIFF record resolves the pointer. It lists actual data the pointer locates within the TIFF file. Therefore, a logical TIFF record is a contiguous stream of data in which a given TIFF file record is written as its TIFF tag number, its field type designation, its number of data values in the file record followed by the actual data associated with that TIFF field.

The invention mates a public key and identity information for the owner of that public key with a digitally signed image file to produce an autonomously secured image file. The preferred embodiment utilizes the TIFF image file format. In the technique described below, the public key and identity information of its owner are stored inside the image file itself in a tamper-proof certificate. When the possessor of any autonomously secured TIFF image possesses the authentication certificate authority's public key, image data integrity and the signing entity (e.g. a bank or a checking account owner) of the image can be strongly established, provided certain digital signatures are verified. The possessor of the image need not consult a large data base of public digital signature verification keys or public key certificates in order to verify the signature on an image. The single public key of the certification authority and the image itself provide all data required for image verification and signing entity determination.

The TIFF image file specifications allow users to define private tags for custom directory entries. These private directory entries allow users of the TIFF image format to define specialized data areas within an image file. Further, these specialized tags are ignored by non-customized TIFF compliant image readers and viewers. Such private tags may even be reserved through Adobe Systems Incorporated so that conflicts in using a single private tag for multiple purposes do not arise.

The invention enables autonomous authentication of data files through use of four private TIFF tags which point to specialized data as described below.

With reference to the TIFF image data file structure set forth in FIG. 1, as previously mentioned, the TIFF file begins with a header 100 containing a pointer to the first IFD. Note that data 102a and 102b may be interspersed anywhere within the TIFF file format.

At the beginning IFD a count of the number of directory entries in the file is contained in a two byte entry 104. This is followed by at least one or, more conventionally, a plurality of directory entries 106a through 106n having a format as described above.

In accordance with the invention, four private custom directory entries specify custom tags or pointers. Directory entry 108 provides a custom tag which locates the public key certificate in the file data. Directory entry 110 includes a custom tag which is used to locate the digital signature in the file data. Directory entry 112 includes a custom tag which is used to locate the authentication certificate's identifying data or identifier. Last, custom directory entry 114 contains a custom tag for specifying the authentication index.

For those files containing more than one IFD, the next IFD is accessed via a pointer stored at location 116. If there are no further IFD's the pointer is set to zero.

The authentication index specified by directory entry 114 contains a list of two-byte tags specifying the actual TIFF fields which are to be included in an authenticatable data stream. Normally all TIFF tags locating raster image data and the public key certificate identifier TIFF tag 112 are included in the authentication index. The authenticatable data stream cannot depend on the signature, because the signature cannot be computed until after the authenticatable data stream is known. Therefore, the custom TIFF tag 110 which stores the signature for the authenticatable data stream is always excluded from the authentication index.

TIFF data is compiled into a data stream to be signed, called the authenticatable data stream, using the authentication index as a guide to what is authenticatable in the file. A logical TIFF record is assembled by sequentially listing its tag number, data type, data value count and actual data. All logical TIFF records, once assembled, are concatenated into a single data stream according to the order of their appearance in the authentication index. Note that in the case of a TIFF field associated with data longer than four bytes, the field is implemented in a TIFF file as a directory entry containing the tag, data type and data count followed by a file offset pointer to the actual data. In assembling the authenticatable data stream, pointers are overwritten by the actual data referenced by the pointer. Offset pointers are excluded from the authenticatable data stream, since it is the data that is to be authenticated, not its order of appearance in the TIFF file.

Each entity wishing to create autonomously secured TIFF images generates or obtains from a trusted third party a public/private key pair for signing images. The public key portion of the key pair, along with identity information for the owner of the key pair, is submitted to a certification authority. The certification authority, after verifying that the identity information is correct, issues the presenter a certificate as described above. A certificate may be stored as a string of bytes in a predetermined format in the file.

The public key certificate for verifying the image signature will be stored as a string of bytes in its own private TIFF field specified by custom tag 108 of FIG. 1. Another private TIFF field 110 stores a tag specifying a digital signature produced according to the method to be described below. An additional private TIFF field 112 is used to indicate information from the public key certificate which is to be included in the authenticatable data stream. This TIFF field 112 can optionally point to data which is part of the public key certificate logical TIFF record, or, it may point to duplicate or alternative data within the TIFF file. In either case, such data identifies the correct public key certificate for use in verifying the signature on the authenticatable data stream.

Thus, in the preferred embodiment of the invention, four private TIFF fields are defined. A field 114 is used for listing all TIFF fields which comprise the authenticatable data stream (the authentication index). Field 108 indicates where a public key certificate is stored within the data file. Field 112 points to data indicating which public key certificate is to be used for authenticating the digital signature on the authenticatable data stream. Finally, field 110 indicates where a digital signature has been recorded in the data file.

A process for creating a digital signature for a TIFF image in accordance with the invention will now be described in conjunction with the flow chart set forth in FIG. 2. In accordance with this method, after entering at step 201, each TIFF tag listed in the authentication index is retrieved from that index at step 203. At step 205, the logical TIFF field corresponding to the tag is assembled. Next, at step 207, the logical TIFF field thus assembled is concatenated with those assembled from previously retrieved tags. If no tags are left in the index as queried at decision block 209, then all logical TIFF fields in order of their appearance in the authentication index have been assembled, thus resulting in a stream of data called the authenticatable data stream which is then submitted to a predetermined algorithm for producing a digital signature at step 211 for the authenticatable data stream. Finally, at step 213 the composed digital signature is now stored in its custom TIFF field reserved for that purpose. The process then terminates at step 215.

Figure 3:
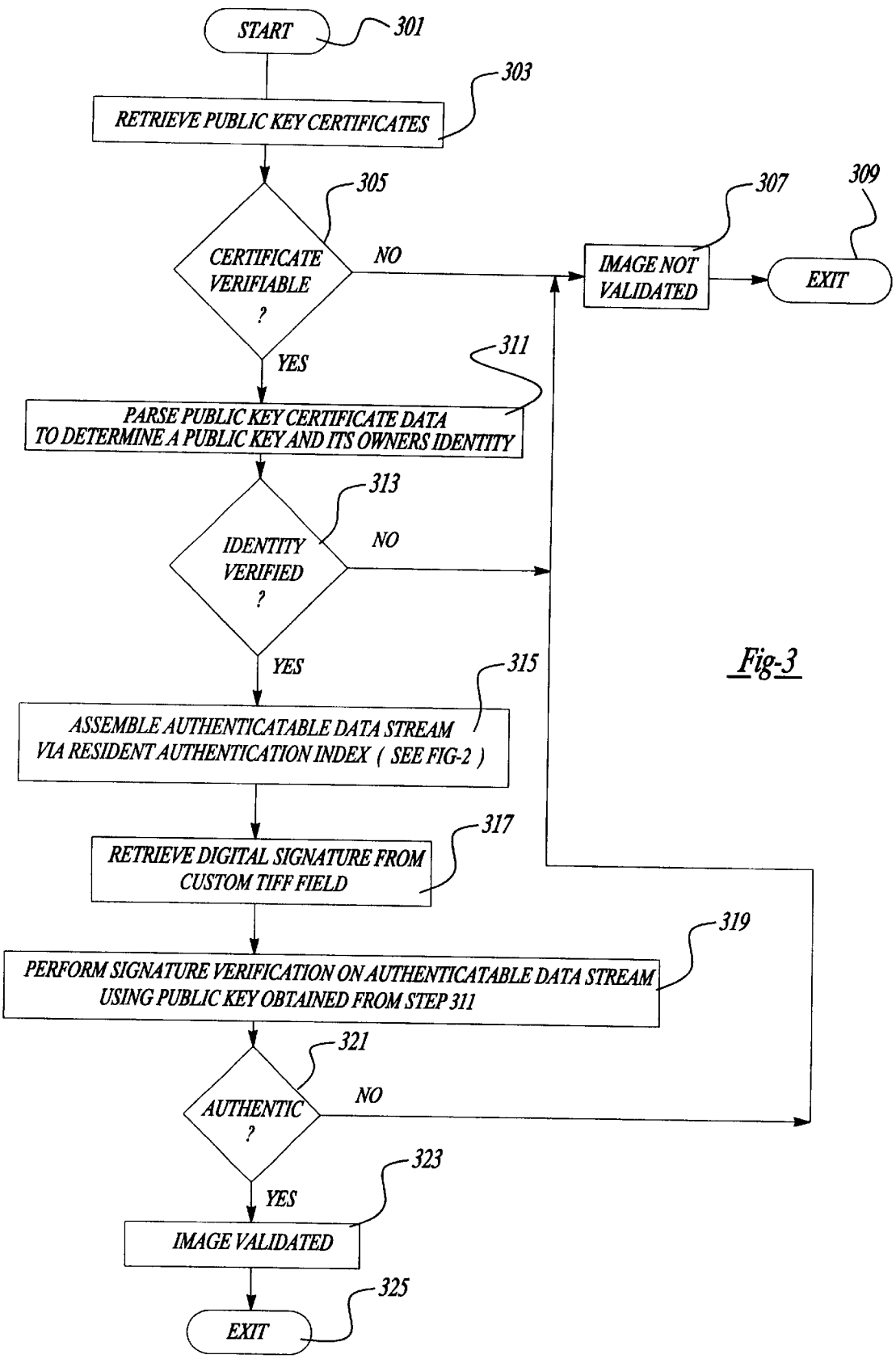
FIG. 3 is a flow chart demonstrating a method for autonomously verifying image data stored in the secured image file.

Once the digital signature, the authentication certificate and the authentication index have been stored in the image data file itself in accordance with the invention, the TIFF image may be autonomously verified by a process described in conjunction with FIG. 3. After entering the method at step 301, the public key certificate is retrieved from the file at step 303. The certificate is verified using the certificate authority public key. At decision step 305, if the certificate fails to verify, then the process stops and the image is designated as not validated at step 307, and the routine is exited at 309. If the certificate is verified, then at step 311 the public key certificate data is parsed to determine the owner of the public key certificate. If the identity indicated in the public key certificate identification TIFF field corresponds to the identity cited in the public key certificate itself, then the identity is verified by the decision step 313. If the identity is not verified, the image is not validated and the routine is exited at 309.

Figure 2:
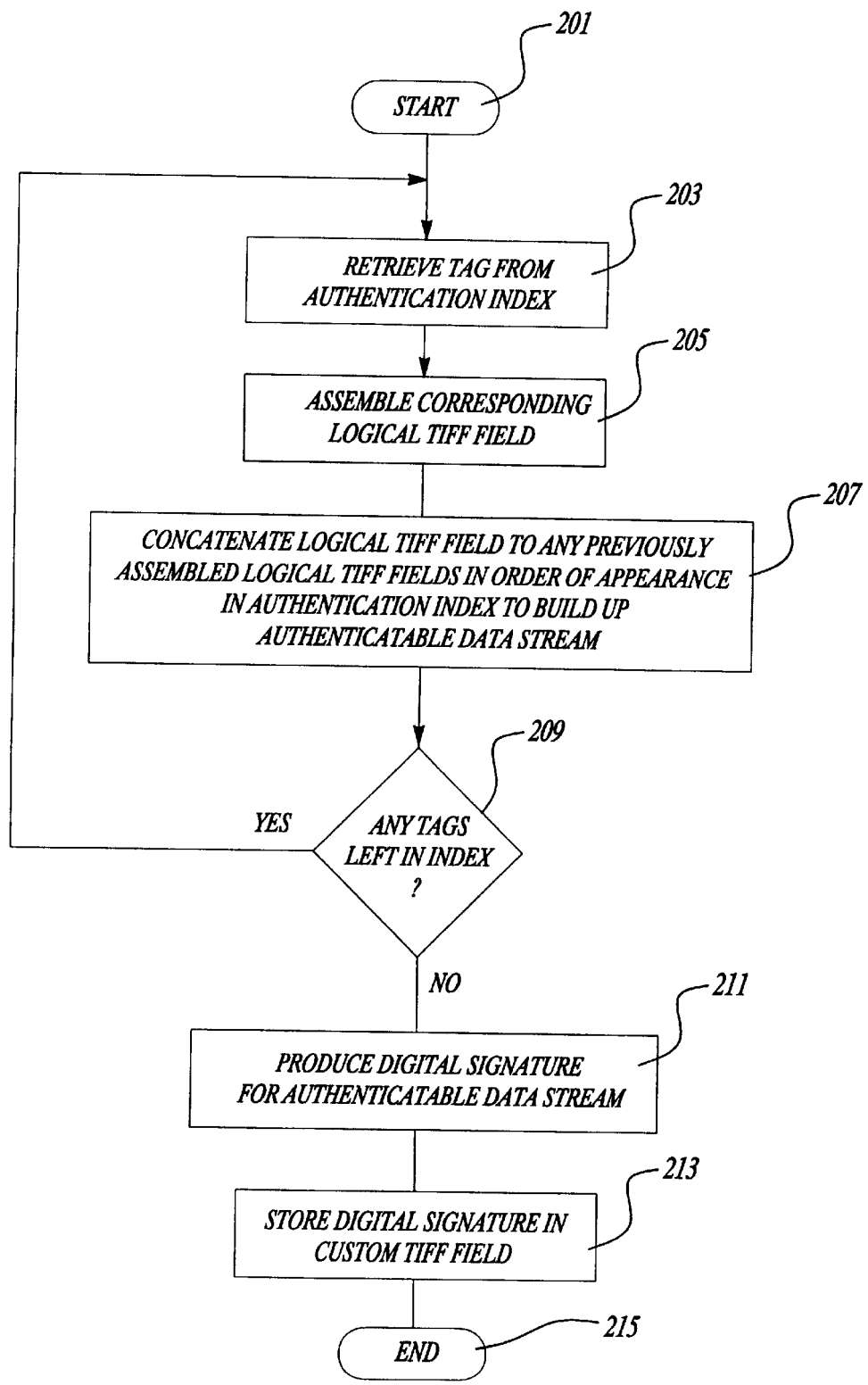
FIG. 2 is a flow chart demonstrating a method of creating a digital signature for the autonomously secured image file.

If verification succeeds, step 315 assembles the authenticatable data stream via the resident authentication index as set forth in conjunction with FIG. 2.

Next, at step 317 the digital signature is retrieved from the file via its custom TIFF tag. Next, at step 319, a signature verification procedure is performed on the authenticatable data stream. Inputs to this procedure are the public key obtained from the public key certificate (tag 108 of FIG. 1) and the authenticatable data stream assembled in step 315. If the signature verifies as determined at decision step 321, then all TIFF fields listed in the authentication index are declared validated at step 323.

The validation success ensures no data which comprises the authenticatable data stream has been altered since being signed by the owner of the public key. Additionally, verification ensures that the owner of the public key, whose identity is indicated in the public key certificate (tag 108 of FIG. 1), sanctioned the data comprising the authenticatable data stream.

While the preferred embodiment has been set forth in the context of a TIFF image data file, those skilled in the art will recognize that file formats other than TIFF may be used to store an autonomously secured image. Such other file formats include the Graphics Interface Format (GIF), Portable Network Graphics File Format (PNG), and FlashPix (PIX) format.

In essence, any image file format may be used with the invention, if that format supports the following two capabilities. First, the format should be capable of identifying a proper subset of data from within an image file. This capability is necessary in order to identify an authenticatable data stream from within the image file. Second, the image file format should support storing authentication data in the image file along with standard image data. The authentication data consists of at least the public key certificate and a digital signature for the authenticatable data stream. The data within the file comprising the authenticatable data stream is either stored by format convention, in a predetermined area of the file or, alternatively, this authenticatable data is identified or tagged by a table of pointers or authentication index.

The invention has been described with reference to a detailed description of a preferred embodiment for the sake of example only. The scope of the invention is to be determined by proper interpretation of the appended claims.

I claim:

1. Autonomously secure image data of a public key certificate owner, the image data having a data file structure comprising:

a plurality of directory entries, including:
- at least one directory entry pointing to at least one field within the data file of the image data;
- a directory entry pointing to the location within the data file of identifying data of an authenticating party for use in determining the appropriate authenticating party public key to use to verify a public key certificate;
- a directory entry pointing to the location within the data file of the public key certificate issued by the authenticating party indicated by the identifying data, the public key certificate including the identity of the public key certificate owner and a public key of the public key certificate owner;
- a directory entry including an authentication index, the authentication index pointing to selected ones of a plurality of directory entries to be included in an authenticatable data stream, wherein the public key of the public key certificate owner can be applied to the authenticatable data stream to create a digital signature; and,
- a directory entry pointing to the location within the data file of a stored digital signature of the authenticatable data stream, wherein the created digital signature and the stored digital signature can be compared to verify the image data and authenticate the identity of the public key certificate owner.

2. The image data file structure of claim 1, wherein the authentication index includes a list of pointers to the image data and pointers to the identifying data of the authenticating party's public key certificate.

3. The image data file structure of claim 2, wherein each pointer in the list comprises two bytes.

4. The data file structure of claim 1, wherein the image data file structure is the tagged image file format (TIFF), and the authentication index, stored digital signature, public key certificate and identifying data are custom directory entries.

5. The data file structure of claim 1, wherein the image data is stored on a computer-readable medium.

6. A method for providing autonomously secure image data of a public key certificate owner, the method comprising the steps of:
- selecting an image file format capable of identifying a subset of the image data and capable of storing non-image authenticating data with the image data;
- storing identifying data of an authenticating party for use in determining the appropriate authenticating party public key to use to verify a public key certificate;
- storing a public key certificate issued by the authenticating party indicated by the identifying data, the public key certificate including the identity of the public key certificate owner and a public key of the public key certificate owner; and,
- storing a digital signature of an authenticatable stream, the authenticatable stream comprising the subset of the image data and a subset of the non-image authenticating data, wherein the public key of the owner can be applied to the authenticatable data stream to create a digital signature, and wherein the created digital signature and the stored digital signature can be compared to verify the image data and authenticate the public key certificate owner's identity.

7. The method of claim 6, further comprising the steps of creating directory entries pointing to the locations of the digital signature, the identifying data and the public key certificate.

8. The method of claim 6, wherein the non-image authenticating data includes the public key certificate, and the digital signature.

9. The method of claim 8, wherein the subset of the non-image data includes the identifying data of the authenticating party.

10. The method of claim 6, wherein the authenticatable stream is stored in a predetermined area of the image file.

11. The method of claim 6, further comprising the step of storing an authentication index, the authentication index including pointers to the locations of data for forming the authenticatable data stream.

12. The method of claim 11, further comprising the step of creating the digital signature.

13. The method of claim 12, wherein the step of creating the digital signature, includes the substeps of:
- retrieving the pointers in the authentication index;
- assembling the data based on the pointers to form the authenticatable data stream; and,
- applying a predetermined algorithm to the authenticatable data stream.

14. The method of claim 13, wherein the authentication data stream is assembled according to the appearance of the pointers in the authentication index.

15. The method of claim 6, further comprising the step of storing the autonomously secure image data on a computer-readable medium.

* * * * *